(12) United States Patent
Fan (10) Patent No.: US 11,328,150 B2
(45) Date of Patent: May 10, 2022

(54) LENS-ARRAY IMAGER

(71) Applicant: OmniVision Technologies, Inc., Santa Clara, CA (US)

(72) Inventor: Regis Fan, Sunnyvale, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 197 days.

(21) Appl. No.: 16/864,026

(22) Filed: Apr. 30, 2020

(65) Prior Publication Data
US 2021/0342565 A1   Nov. 4, 2021

(51) Int. Cl.
*G06K 9/00* (2022.01)
*G02B 3/00* (2006.01)

(52) U.S. Cl.
CPC ......... *G06K 9/0004* (2013.01); *G02B 3/0056* (2013.01)

(58) Field of Classification Search
CPC ................ G06K 9/0004; G02B 3/0056
See application file for complete search history.

(56) References Cited

U.S. PATENT DOCUMENTS

6,137,535 A * 10/2000 Meyers ............... H04N 5/3415
348/340
7,897,903 B2   3/2011 Duparre et al.
(Continued)

*Primary Examiner* — Seung C Sohn
(74) *Attorney, Agent, or Firm* — Lathrop GPM LLP (57) ABSTRACT

A lens-array imager includes lenses $L_m$ forming a lens array having a pitch $d_x$, a pixel array including pixel-array regions $R_m$, and apertured baffle-layers therebetween; m={0, 1, 2, ... }. Each pixel-array region has a width $r_x < d_x$ and pitch $p_x < d_x$. Each apertured baffle-layer is at a respective distance $z_k$ from the pixel array and has a respective plurality of aperture stops $A_m$ forming an aperture-stop array. A center of each aperture stop $A_m$ is collinear with both a center of region $R_m$ and an optical center of lens $L_m$. Each aperture-stop array has a pitch that approaches $p_x$ as $z_k$ approaches zero and approaches lens pitch $d_x$ as $z_k$ approaches a distance $z_L$ between lens $L_0$ and region $R_0$. A width of each aperture stop $A_m$ has an upper limit that increases from $p_x$, when $z_k$ equals zero, to $W_x$ when distance $z_k$ equals $z_L$.

19 Claims, 3 Drawing Sheets

(56) References Cited

U.S. PATENT DOCUMENTS

| | | | |
|---|---|---|---|
| 8,629,930 B2 | 1/2014 | Brueckner et al. | |
| 8,717,485 B2 | 5/2014 | Oberdoerster et al. | |
| 9,202,833 B2 * | 12/2015 | Mackey | H01L 27/14627 |
| 9,829,614 B2 | 11/2017 | Smith et al. | |

* cited by examiner

LENS-ARRAY IMAGER

BACKGROUND

Fingerprint sensing is becoming an increasingly common tool for authorizing (a) access to electronic devices, such as smartphones, (b) access to confidential electronic records, and (c) electronic transactions such as financial transactions carried out over the internet. Fingerprint sensing satisfies market demand for an authentication mechanism that eliminates the need to enter (and remember) a passcode, and also eliminates the need to keep track of multiple different passcodes associated with different devices and/or accounts. Fingerprint sensing is a well-established form a biometric identification, and optical fingerprint sensors have been used for years, e.g., by law enforcement agencies.

Several different types of fingerprint sensors have been designed for use in smartphones. Each of these types of fingerprint sensors images a finger to obtain the fingerprint. A camera-based fingerprint scanner captures an image of a fingerprint using an imaging lens and an image sensor. A collimator-based fingerprint scanner senses a fingerprint with a lens array aligned over an image sensor.

SUMMARY OF THE EMBODIMENTS

While the imaging lens of a camera-based fingerprint scanner enables the image sensor to be narrower than the imaging lens, the focal length of the imaging lens places a lower limit on the height of the fingerprint scanner. A collimator-based fingerprint scanner suffers from the opposite problem by limiting compactness in width. While the lens array enables the fingerprint scanner to be shorter than a comparable camera-based fingerprint scanner, it also requires the width of the image sensor to be at least as wide as the lens array. Embodiments disclosed herein overcome these problems of camera-based and collimator-based fingerprint scanners.

A lens-array imager includes a plurality of lenses $L_{m=0}$, $L_1, \ldots, L_{N-1}$, an image sensor including a plurality of pixels forming a pixel array including a plurality of pixel-array regions $R_{m=0}, R_1, \ldots, R_{N-1}$, and a plurality of apertured baffle-layers between the image sensor and the lens array. Each of the plurality of lenses has a width $W_x$ and forms a lens array having a lens pitch $d_x$ in a transverse direction that is orthogonal to an optical axis of lens $L_0$ that defines a longitudinal direction. Each of the plurality of pixel-array regions $R_{m=0}, R_1, \ldots, R_{N-1}$ has a sensor-region width $r_x$ and sensor-region pitch $p_x$ that are each less than lens pitch $d_x$ in the transverse direction. Each of the plurality of apertured baffle-layers is located at a respective distance $z_k$ from the pixel array and has a respective plurality of aperture stops $A_{m=0}, A_1, \ldots, A_{N-1}$ forming an aperture-stop array. A center of each aperture stop $A_m$ is collinear with both (i) a center of pixel-array region $R_m$ and (ii) an optical center of lens $L_m$. The aperture-stop array has an aperture-stop pitch $a_x$ in the transverse direction that approaches sensor-region pitch $p_x$ as distance $z_k$ approaches zero and approaches lens pitch $d_x$ as distance $z_k$ approaches a distance $z_L$ between lens $L_0$ and pixel-array region $R_0$ along the longitudinal direction. A width of each aperture stop $A_m$ has an upper limit that increases from sensor-region pitch $p_x$, when distance $z_k$ equals zero, to $W_x$ when distance $z_k$ equals distance $z_L$. As such, aperture stops $A_m$ collectively transmit, through lens $L_m$, a range of chief-ray angles, and associated marginal rays, within an angle subtended by pixel-array region $R_m$ from the optical center of lens $L_m$ while blocking chief-rays and associated marginal rays outside of the subtended angle.

DETAILED DESCRIPTION OF THE EMBODIMENTS

Figure 1:
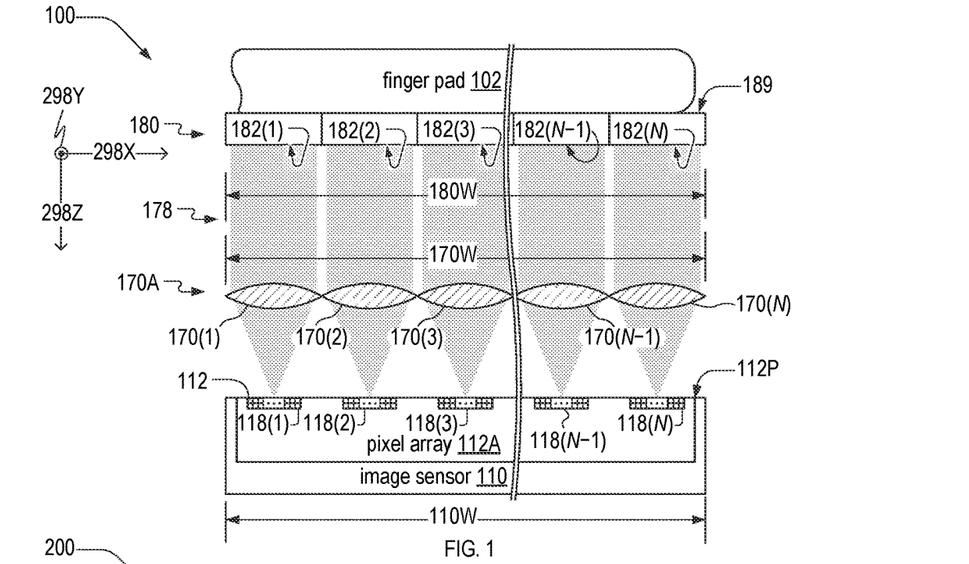
FIG. 1 is a schematic cross-sectional view of a collimator sensor configured to capture an image of a fingerprint of a finger pad.

FIG. 1 is a schematic cross-sectional view of a collimator sensor 100 configured to capture an image of a fingerprint of a finger pad 102. The cross-sectional view of FIG. 1 is parallel to a plane, hereinafter the x-z plane, formed by orthogonal directions 298X and 298Z, which are each orthogonal to a direction 298Y. Herein, the x-y plane is formed by orthogonal directions 298X and 298Y, and planes parallel to the x-y plane are referred to as transverse planes. Also, a transverse direction refers to one or both of directions 298X and 298Y. Unless otherwise specified, heights of objects herein refer to the object's extent in direction 298Z, or a direction 180° opposite thereto.

Collimator sensor 100 includes an image sensor 110, a lens array 170A, and a plate 180. Plate 180 has a top surface 189 and a bottom surface that includes a plurality of plate regions 182(1-N). Plate 180 has a width 180W that is sufficiently large to accommodate a fingerprint of finger pad 102 in direction 298X.

Lens array 170A includes a plurality of lenses 170(1-N). Image sensor 110 includes a pixel array 112A, which includes a plurality of pixels 112. Pixel array 112A includes a plurality of pixel-array regions 118(1-N). A detection plane 112P of pixel array 112A is located at a focal plane of each lens 170. In embodiments, detection plane 112P intersects a microlens array of image sensor 110 that is aligned to pixel array 112. Pixel array 112A and lens array 170 have respective widths 110W and 170W.

Each lens 170 has an optical axis aligned with a center of a respective pixel-array region 118 and a center of a respective plate region 182. Illumination incident on a lens 170(q) having propagated from the center of a pixel-array region 118(q) aligned thereto is transmitted by lens 170(q) as collimated illumination 178 that propagates toward plate region 182(q). Index q is an integer ranging from 1 to N. Accordingly, the minimum values of widths 110W and 170W are limited by width 180W such that width 180W limits the compactness of collimator sensor 100. Embodiments disclosed in subsequent figures remedy this problem.

Figure 2:
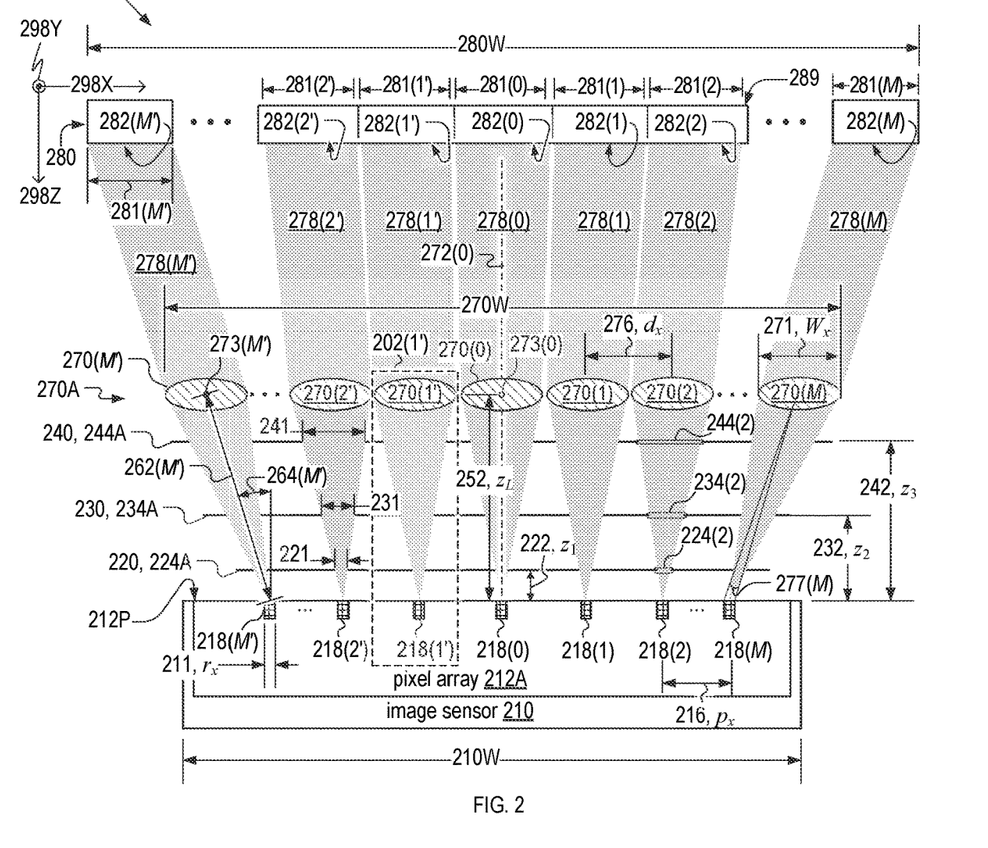
FIG. 2 is a schematic cross-sectional view of a lens-array imager configured to capture an image of a fingerprint, in an embodiment.

FIG. 2 is a schematic cross-sectional view of a lens-array imager 200 configured to capture an image of a fingerprint of finger pad 102. Lens-array imager 200 includes a plurality of lenses 270(0-M) and 270(1'-M') and an image sensor 210, where N=(M+1)+M'. Lens 270(0) has an optical axis 272(0), which is parallel to direction 298Z. Lenses 270 form a lens array 270A that has a lens-array pitch 276 (herein also $d_x$) defined by a transverse distance between optical axes of adjacent lenses 270. Each lens 270 has a width 271 (herein also $W_x$), which is less than or equal to lens-array pitch 276. Each lens 270(m) has a respective optical center 273(m); FIG. 2 denotes an optical center 273(0) of lens 270(0). Herein, index m is an integer in the range 0-M or 1'-M'.

Lens-array sensor 200 may include a plate 280. Plate 280 has a top surface 289 and a bottom surface that includes a plurality of plate regions 282(0-M, 1'-M'). Plate 280 has a width 280W that is sufficiently large to accommodate a fingerprint of finger pad 102 in direction 298X.

Image sensor 210 includes a plurality of pixels 212 that form a pixel array 212A. Pixel array 212A includes a plurality of pixel-array regions 218(0-M, 1'-M') spaced at a sensor-region pitch 216 (herein also $p_x$) that is less than lens-array pitch 276 ($d_x$) in a transverse direction. Each pixel-array region 218(m) has a respective sensor-region width 211(m) (herein also r), each of which is less than or equal to sensor-region pitch 216 ($r_x \leq p_x$). In embodiments, each sensor-region width 211(m) has the same value for each value of index m. Herein $r_x$ denotes sensor-region width 211, and may vary according to index m or be constant.

FIG. 2 denotes a perpendicular distance 252 (herein also $z_L$) between pixel array 212A and optical center 273(0) along optical axis 272(0). Each pixel-array region 218 includes at least one pixel 212. For example, pixel-region 218 is an $n_x \times n_y$ array of pixels 212, where $n_x$ and $n_y$ are positive integers. In embodiments, perpendicular distance 252 is between 0.4 mm and 0.08 mm.

Pixel array 212A, lens array 270, and plate 280 have respective widths 210W, 270W, and 280W. In embodiments, width 210W is less than width 270W, which may be less than width 280W. For example, width 280W is between five and seven millimeters, and width 270W is at most eighty percent of width 280W.

FIG. 2 denotes a detection plane 212P, which is similar to detection plane 112P. In embodiments, detection plane 212P intersects a microlens array, of image sensor 210, that is aligned to pixel array 212A. In embodiments, pixel array 212A is non-planar, such that detection plane 212P is a segmented plurality of planes each located above a respective pixel-array region 218.

Lens-array imager 200 also includes apertured baffle-layers 220, 230, and 240 between lens array 270A and image sensor 210. Baffle layers 220, 230, and 240 are located at respective distances 222, 232, and 242 (herein also $z_{1-3}$ and $z_k$, where index k=1, 2, 3) from plane 212P. In embodiments, each apertured baffle-layer 220, 230, and 240 is formed of an opaque material, such as a black polymer photoresist. In embodiments, distance 222 equals zero such that baffle-layer 220 is disposed directly on detection plane 212P.

While FIG. 2 illustrates lens-array imager 200 with three apertured baffle-layers, lens-array imager 200 may include any number of apertured baffle-layers without departing from the scope of the embodiments. In embodiments, lens-array imager 200 includes four aperture baffle layers, which in some configurations sufficiently reduce cross-talk. Herein, disclosed features of one or more of apertured-baffle layers 220, 230, and 240 may also apply to said additional apertured baffle-layers.

In embodiments, each apertured baffle-layer 220-240 is on a respective substrate. For example, lens-array imager 200 may include at least one of (i) a substrate between detection plane 212P and apertured baffle-layer 220, and (ii) a substrate between apertured baffle-layers 220 and 230. In embodiments, the substrates are transparent, e.g., to visible and/or near-infrared light, and are formed of a dielectric, such as glass.

Each apertured baffle-layer of lens-array imager 200 has a front surface, a rear surface, and a plurality of middle surfaces therebetween each forming a respective one of a plurality of aperture stops of the apertured baffle-layer. For example, each apertured baffle-layer 220, 230, and 240 has a respective plurality of aperture stops 224(0-M, 1'-M'), 234(0-M, 1'-M'), and 244(0-M, 1'-M'). Aperture stops 224, 234, and 244 form respective aperture stop arrays 224A, 234A, and 244A. A center of each aperture stop 224(m), 234(m), 244(m) is collinear with both (i) a center of pixel-array region 218(m) and (ii) an optical center of lens 270(m). For example, each of aperture stops 224(2), 234(2), 244(2) is collinear with both (i) a center of pixel-array region 218(2) and (ii) the optical center of lens 270(2).

FIG. 2 denotes illumination 278(m) emitted by respective plate region 282(m) that is incident on lens 270(m), transmitted by each aperture-stops 244(m), 234(m), and 224(m), and reaches pixel-array region 218(m). Herein, index m denotes one of indices 0-M and 1'-M'. When only illumination 278(m) reaches pixel-array region 218(m), lens-array imager 200 is said to operate in an isomorphic mode, which denotes a one-to-one mapping of illumination from a plate region 282(m) to pixel-array region 218(m), which crosstalk from adjacent pixel-array regions 218($l \neq m$) being below a predetermined threshold.

Lens-array imager 200 includes N light-collectors 202. Each light-collector 202(m) includes lens 270(m), aperture-stops 244(m), 234(m), and 224(m), and pixel-array region 218(m). For clarity of illustration, FIG. 2 labels only light-collector 202(l'). Each light collector 202 has a respective field of view 281(m) at plate region 282(m).

Aperture-stop arrays 224A, 234A, and 244A have respective aperture-stop pitches 226, 236, and 246 in a transverse direction. Aperture-stop pitch 226 approaches sensor-region pitch 216 ($p_x$) as distance 222 ($z_1$) approaches zero and approaches lens-array pitch 276 ($d_x$) as distance 222 approaches distance 252. The same applies to aperture-stop pitches 236 and 246. Aperture-stop pitch 236 approaches sensor-region pitch 216 ($p_x$) as distance 232 ($z_2$) approaches zero and approaches lens-array pitch 276 ($d_x$) as distance 232 approaches distance 252. Aperture-stop pitch 246 approaches sensor-region pitch 216 ($p_x$) as distance 242 ($z_3$) approaches zero and approaches lens-array pitch 276 ($d_x$) as distance 242 approaches distance 252.

Each of aperture-stop pitch 226, 236, and 246 is an example of an aperture-stop pitch $a_x$ of an apertured baffle-layers of lens-array imager 200. Aperture-stop pitch $a_x$ approaches sensor-region pitch $p_x$ as distance $z_k$ approaches zero and approaches lens-array pitch $d_x$ as distance $z_k$ approaches a distance 252. In embodiments, aperture-stop pitch $a_x$ is a linear function of $z_k$ that ranges from sensor-region pitch $p_x$ at distance $z_k$ equals zero to pitch $d_x$ when distance $z_k$ equals distance 252. In embodiments, the linear function $a_x(z_k)$ equals $(1-z_k/z_L)p_x+(z_k/z_L)d_x$, where $z_L$ is distance 252, $p_x$ is sensor-region pitch 216 and $d_x$ is lens-array pitch 276.

Aperture-stop arrays 224A, 234A, and 244A have respective aperture-stop widths 221, 231, and 241 in a transverse direction. Aperture-stop width 221 increases from sensor-region pitch 216 ($p_x$), when distance 222 ($z_1$) equals zero, to width 271 ($W_x$) when distance 222 ($z_1$) equals distance 252. The same applies to aperture-stop widths 231 and 241. Aperture-stop width 231 increases from sensor-region pitch 216 ($p_x$), when distance 232 ($z_2$) equals zero, to width 271

($W_x$) when distance 232 ($z_2$) equals distance 252. Aperture-stop width 241 increases from sensor-region pitch 216 ($p_x$), when distance 242 ($z_3$) equals zero, to width 271 ($W_x$) when distance 242 ($z_3$) equals distance 252. A result of this limitation on aperture stop widths 221, 231, and 241 is that aperture stops 224(m), 234(m), 244(m) collectively transmit, through lens 270(m), a range of chief-ray angles, within an angle subtended by pixel-array region 218(m) from the optical center of lens 270(m) while blocking chief-rays and associated marginal rays outside of the subtended angle. This limitation hence enables lens-array imager 200 to operate at the aforementioned isomorphic mode.

For example, FIG. 2 illustrates a subtended angle 277(M) subtended by pixel-array region 218(M) of chief-ray angles transmitted through aperture-stops 224(M), 234(M), and 244(M). The size of the aperture stop closest to pixel array 212A, aperture-stop 224(M) in this example, limits the range of transmitted chief-ray angles, while other aperture-stops (234, 244 in this example) block marginal rays. Blocked marginal rays include marginal rays associated with chief rays transmitted through the closest aperture stop aperture-stop 224(M). The widths of aperture stops 224(M), 234(M), and 244(M) result in pixel-array region 218(M) receiving only light emitted from plate region 282(M) that reaches lens 270(M), defined herein as illumination 278(M).

In embodiments, each of aperture-stop widths 221, 231, and 241 is less than or equal to $r_x+(z_k/z_L)W_x$ where $z_L$ is distance 252, $r_x$ is sensor-region width 211, and $W_x$ is lens-width 271. For example, each of aperture-stop widths 221, 231, and 241 is less than or equal to $(z_k/z_L)W_x$, which in part enables the focused spot size of illumination 278 reaching pixel-array region 219 to be less than sensor-region width 211. This increases alignment tolerance of lens array 270A to pixel-array regions 218 and apertures of aperture-stop arrays 224A, 234A, and 244A. In embodiments, distance 222 (an example of $z_k$) equals zero and aperture-stop width 221 is less than sensor-region width 211, which also increases the aforementioned alignment tolerance.

While limiting the size of aperture-stop widths 221, 231, and 241 as thus far discussed is valuable for enabling lens-array imager 200 to operate in the isomorphic mode, the aperture-stop widths 221, 231, and 241 may be too small, for example, when $(z_k/z_L)W_x$ is smaller than a diffraction-limited spot size formed by lens 270(m) and pixel-array region 218(m). In embodiments, when $(z_k/z_L)W_x$ is smaller than this diffraction-limited spot size, the width of each aperture stop (e.g., aperture-stop widths 221, 231, and 241) may exceed $(z_k/z_L)W_x$ and/or be less than or equal to the diffraction-limited spot size.

Each lens 270(m) has a respective geometric-path-length 262(m) between an optical center of lens 270(m) and a center of pixel-array region 218(m). For example, FIG. 2 denotes a geometric-path-length 262(M') between optical center 273(M') of lens 270(M') a center of pixel-array region 218(M'). For clarity of illustration, FIG. 2 does not denote other geometric-path-lengths 262($m \neq M'$).

In embodiments, geometric-path-length 262(m) is less than a focal length $f_m$ of lens 270(m) such that lens 270(m) is configured to focus converging light incident thereon to the center of pixel-array region 218(m). In such embodiments, each of illumination 278(m) propagating between plate region 282(m) to lens 270(m) is converging, and lens 270(m) focuses illumination 278(m) at detection plane 212P. Technical benefits of this limitation include (i) allowing lens-array imager 200 to operate in isomorphic mode and (i) allowing width 270W to be less than width 280W of plate 280, hence facilitating compactness of lens-array imager 200.

Each geometric-path-length 262(m) is along a linear path oriented at an angle 264(m) with respect to optical axis 272(0). For example, FIG. 2 denotes an angle 264(M'). For clarity of illustration, FIG. 2 does not denote other angles 264($m \neq M'$). Denoting angle 264(m) as $\theta_m$, angle 264(m) satisfies $\tan \theta_m = m(d_x - p_x)/z_L$. The largest of angles 264 are angles 264(M) and 264(M'), which in embodiments are between twenty-five and thirty-five degrees.

Figure 3:
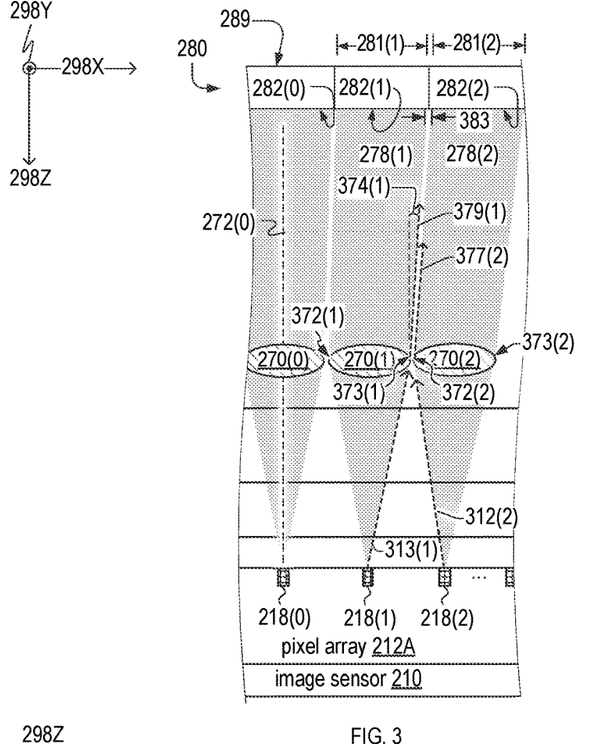
FIG. 3 is a schematic cross-sectional view of part of the lens-array imager of FIG. 2.

FIG. 3 is a schematic cross-sectional view of part of lens-array imager 200 that includes pixel-array regions 218(0-2), lenses 270(0-2), and plate regions 282(0-2). Each lens 270(m) has a near edge 372(m) and a far edge 373(m) with respect to lens 270(0). In embodiments, focal length $f_m$ of lens 270(m) and focal length $f_{m+1}$ of lens 270(m+1) are configured such that the following two conditions are satisfied. First, a first light ray 313(m) propagating from a center of pixel-array region 218(m) toward far edge 373(m) exits lens 270(m) at a propagation angle 374(m) with respect to optical axis 272(0). Second, a light ray 312(m+1) propagating from a center of pixel-array region 218(m+1) toward the near edge of lens 270(m+1) exits lens 270(m+1) at propagation angle 374(m). Such a configuration of focal lengths of adjacent lenses 270 results in lens-array imager 200 operating in the isomorphic mode.

For example, FIG. 3 illustrates near edge 372(1) and far edge 373(1) of lens 270(1) and near edge 372(2) and far edge 373(2) of lens 270(2). FIG. 3 illustrates light rays 313(1) and 312(2). Light ray 313(1) propagates from a center of pixel-array region 218(1) toward far edge 373(1) of lens 270(1) and exits lens 270(1) as a light ray as a light ray 379(1), which propagates at an angle 374(1) with respect to optical axis 272(0). Light ray 312(2) propagates from a center of pixel-array region 218(2) toward near edge 372(2) of lens 270(2). In embodiments, light ray 312(2) exits lens 270(2) as a light ray 377(2), which propagates at angle 374(1) with respect to optical axis 272(0). Stated more generally, in embodiments, light rays 379(m) and 377(m+1) propagate in the same direction.

In embodiments, focal length $f_m$ is an increasing function of an angle 264(m). Denoting geometric-path-length 262(m) as $g_m$, $\cos \theta_m = z_L/g_m$. As angle 264(m) increases, geometric-path-length 262(m) also increases. To compensate for this increase in geometric path length, focal length $f_m$ also increases to maintain lens-array imager 200's operation in the isomorphic mode. For example, focal length $f_m$ increases as a function of angle 264(m) to ensure that light rays 379(m) and 377(m+1) propagate in the same direction, which minimizes or reduces the width of gaps between adjacent fields of view 281(m) and 281(m±1) of adjacent light collectors 202(m) 202(m±1). For example, FIG. 3 denotes a gap 383 between fields of view 281(1) and 282(2). A benefit of focal length $f_m$ being an increasing function of an angle 264(m) is to keep gap 383 small such that fingerprint of finger pad 102 can be adequately imaged.

Figure 4:
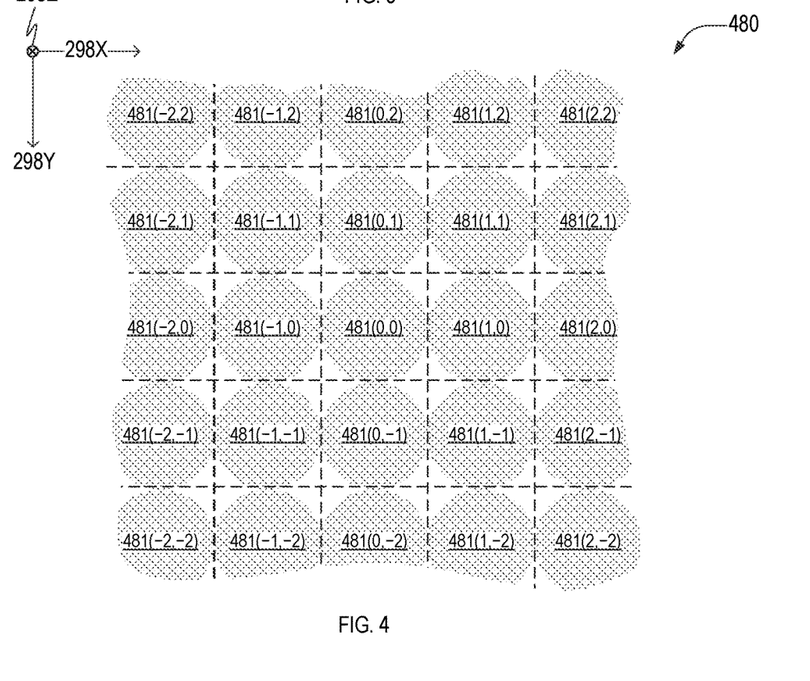
FIG. 4 is a plan view of a first embodiment of the lens-array imager of FIG. 2.

In embodiments, light collectors 202 are arranged in a two-dimensional array in a transverse plane. FIG. 4 is a plan view of a plate 480 with fields of view 481($m_x,m_y$) at respective plate regions 482($m_x,m_y$). Plate 480, fields of view 481, and plate regions 482 are respective examples of plate 280, field of view 281, and plate regions 282 of lens-array imager 200, FIG. 2. Each field of view 481($m_x$, $m_y$) is a field of view of a respective light collector 202($m_x$, $m_y$) of an embodiment of lens-array imager 200. In the example of FIG. 4, fields of view 481 are circular and adjacent fields of view 481 are adjoining, such that there is no gap between centers of adjacent fields of view 481 along either direction 298X and 298Y.

In embodiments, each focal length $f_m$ is equal, which has the benefit of lower-cost manufacturing and the cost of a non-uniform field of view. In a first uniform-focal-length embodiment, focal length $f_0$ is greater than distance 252 ($g_0 < f_0$), and all other focal lengths $f_m = f_0$. In such embodiments, since geometric-path-length $g_m$ is an increasing function of m, geometric-path-length 262(m) exceeds focal length $f_m$ for values of index m that exceed a threshold value $m_1$. For index ($m_1$−1), geometric-path-length 262($m_1$−1) is less than or equal to focal length $f_{m_1−1}$.

Figure 5:
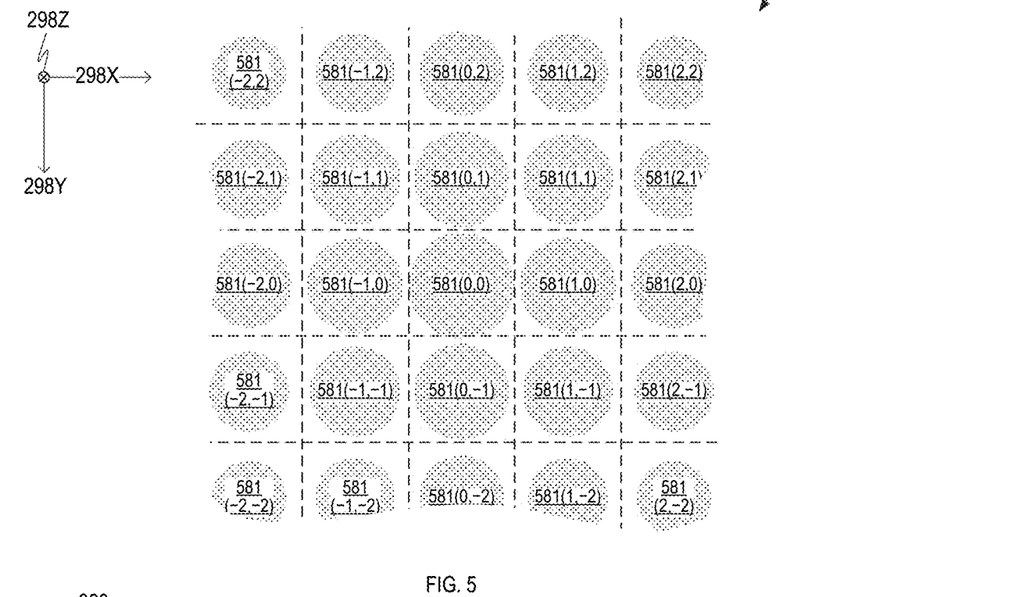
FIG. 5 is a plan view of a second embodiment of the lens-array imager of FIG. 2.

FIG. 5 is a plan view of a plate 580 and fields of view 581($m_x,m_y$) at respective plate regions 582($m_x,m_y$). Plate 580, field of views 581, and plate regions 582 are respective examples of plate 280, field of views 281, and plate regions 282 of lens-array imager 200, FIG. 2, in the first uniform-focal-length embodiment. In this embodiment, fields of view 581($m_x,m_y$) associated with a light collector decreases as a function of the light collector's distance from the light collector at ($m_x,m_y$)=(0, 0). Whereas adjacent fields of view 481 are adjoining (FIG. 4), adjacent fields of view 581 are, in embodiments, not adjoining, which results in larger gaps therebetween and hence a more sparsely sampled image of finger pad 102.

In embodiments, field of view 581(0,0) is increased such that it is tangential to, or overlaps with, at least one the eight fields of view 581 adjacent to field of view 581(0,0). which increases detected illumination at the expense of cross-talk. One means of increasing field of view 581(0,0) is to deviate from the uniform focal-length embodiment by increasing the focal length of lens 270(0,0) compared to the common focal length of other lenses 270. A second means is to maintain the uniform focal lengths while decreasing the distance between lens 270(0,0) and detection plane 212P such that lens 270(0,0) is no longer coplanar with other lenses 270.

Figure 6:
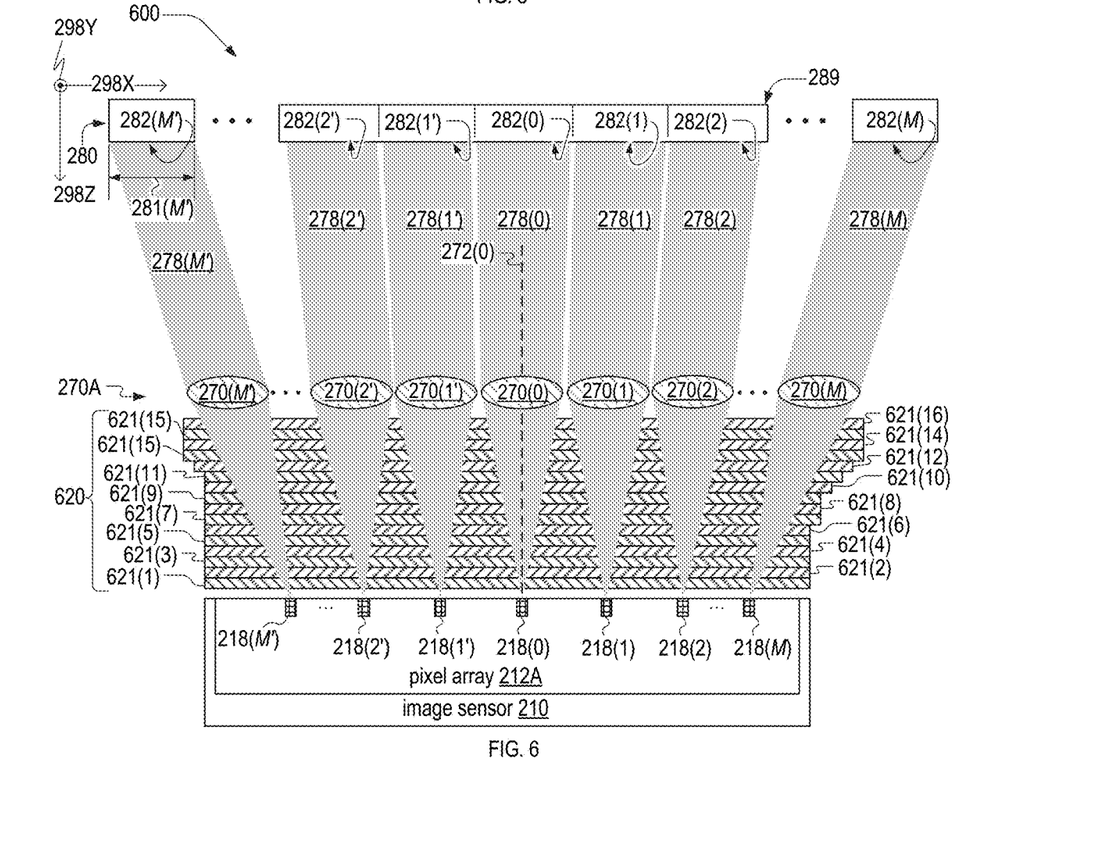
FIG. 6 is a schematic cross-sectional view of a lens-array imager, which is an example of the lens-array imager of FIG. 2.

FIG. 6 is a schematic cross-sectional view of a lens-array imager 600, which is lens-array imager 200 with apertured baffle-layers 220, 230, and 240 replaced by a single monolithic baffle layer 620. Monolithic baffle layer 620 may be viewed as a plurality of adjoining apertured baffle-layers 621(1-$N_L$), where $N_L$ is a positive integer. In the example of FIG. 6, $N_L$=16. In embodiments, monolithic baffle layer 620 is formed via an additive process, such as a layer-by-layer deposition of baffle layers 621(1-$N_L$). Distinct layers 621 of baffle layer 620 may be indistinguishable. Each apertured baffle-layer 621 is an example of an apertured baffle-layer of lens-array imager 200. In direction 298Z, a distance between adjacent apertured baffle-layers 621 is zero. In embodiments, monolithic baffle layer 620 is formed via a subtractive process, and each layer 621 of monolithic baffle layer 620 refers to a respective depth range therein.

Combinations of Features

Features described above and those claimed below may be combined in various ways without departing from the scope hereof. The following enumerated examples illustrate some possible, non-limiting combinations:

(A1) A lens-array imager includes a plurality of lenses $L_{m=0}, L_1, \ldots, L_{N-1}$, an image sensor including a plurality of pixels forming a pixel array including a plurality of pixel-array regions $R_{m=0}, R_1, \ldots, R_{N-1}$, and a plurality of apertured baffle-layers between the image sensor and the lens array. Each of the plurality of lenses has a width $W_x$ and forms a lens array having a lens pitch $d_x$ in a transverse direction that is orthogonal to an optical axis of lens $L_0$ that defines a longitudinal direction. Each of the plurality of pixel-array regions $R_{m=0}, R_1, \ldots, R_{N-1}$ has a sensor-region width $r_x$ and sensor-region pitch $p_x$ that are each less than lens pitch $d_x$ in the transverse direction. Each of the plurality of apertured baffle-layers is located at a respective distance $z_k$ from the pixel array and has a respective plurality of aperture stops $A_{m=0}, A_1, \ldots, A_{N-1}$ forming an aperture-stop array. A center of each aperture stop $A_m$ is collinear with both (i) a center of pixel-array region $R_m$ and (ii) an optical center of lens $L_m$. The aperture-stop array has an aperture-stop pitch $a_x$ in the transverse direction that approaches sensor-region pitch $p_x$ as distance $z_k$ approaches zero and approaches lens pitch $d_x$ as distance $z_k$ approaches a distance $z_L$ between lens $L_0$ and pixel-array region $R_0$ along the longitudinal direction. A width of each aperture stop $A_m$ has an upper limit that increases from sensor-region pitch $p_x$, when distance $z_k$ equals zero, to $W_x$ when distance $z_k$ equals distance $z_L$. As such, aperture stops $A_m$ collectively transmit, through lens $L_m$, a range of chief-ray angles, and associated marginal rays, within an angle subtended by pixel-array region $R_m$ from the optical center of lens $L_m$ while blocking chief-rays and associated marginal rays outside of the subtended angle.

(A2) In lens-array imager (A1) the aperture-stop pitch $a_x$ may be a linear function of $z_k$ that ranges from sensor-region pitch $p_x$ at distance $z_k$ equals zero to lens pitch $d_x$ when distance $z_k$ equals distance $z_L$.

(A3) In lens-array imager (A2), the linear function may be $(1-z_k/z_L)p_x+(z_k/z_L)d_x$.

(A4) In a lens-array imager according to any of (A1)-(A3), the width of each of the plurality of aperture stops may be less than or equal to $r_x+(z_k/z_L)W_x$.

(A5) In a lens-array imager according to any of (A1)-(A4), the width of each of the plurality of aperture stops may be less than or equal to $(z_k/z_L)W_x$.

(A6) In a lens-array imager according to any of (A1)-(A5), the width of each of the plurality of aperture stops may be less than or equal to the larger of $(z_k/z_L)W_x$ and the diffraction-limited spot size formed by lens $L_m$ at pixel-array region $R_m$.

(A7) In a lens-array imager according to any of (A1)-(A6), when $(z_k/z_L)W_x$ is larger than a diffraction-limited spot size formed by lens $L_m$ at pixel-array region $R_m$, the width of each aperture stop $A_m$ may be less than or equal to $(z_k/z_L)W_x$. When $(z_k/z_L)W_x$ is smaller than the diffraction-limited spot size, the width of each aperture stop $A_m$ may be less than or equal to the diffraction-limited spot size.

(A8) In a lens-array imager according to any of (A1)-(A7), for each lens $L_m$, a geometric-path-length between an optical center of lens $L_m$ and a center of pixel-array region $R_m$ may be less than a focal length $f_m$ of lens $L_m$ such that lens $L_m$ is configured to focus converging light incident thereon to the center of pixel-array region $R_m$.

(A9) In lens-array imager (A8), in which lens $L_m$ has a far edge with respect to lens $L_0$, lens $L_{m+1}$ has a near edge with respect to lens $L_0$ and adjacent to the far edge, focal length $f_m$ of lens $L_m$ and focal length $f_{m+1}$ of lens $L_{m+1}$ may be configured such that: a first light ray propagating from a center of pixel-array region $R_m$ toward the far edge of lens $L_m$ exits lens $L_m$ at a first propagation angle with respect to the longitudinal direction; and a second light ray propagating from a center of pixel-array region $R_{m+1}$ toward the near edge of lens $L_{m+1}$ exits lens $L_{m+1}$ at the first propagation angle.

(A10) In a lens-array imager according to any of (A8) and (A9), the geometric-path-length defining a geometric-path-direction a plane of the transverse direction and the longitudinal direction, the focal length $f_m$ may be an increasing function of an angle $\theta_m$ between the geometric-path-direction and the longitudinal direction.

(A11) In lens-array imager (A10), a deviation of angle $\theta_m$ from zero degrees may be an increasing function of a distance between lens $L_m$ and lens $L_0$ in the transverse direction; and of angles $\{\theta_0, \theta_1, \ldots, \theta_{N-1}\}$, angle $\theta_0$ may be closest to zero degrees.

(A12) In a lens-array imager according to any of (A10) or (A11), the lens array may be in a lens-array plane perpendicular to the longitudinal direction, the pixel array may be in the pixel-array plane, and angle $\theta_m$ may satisfy tan $\theta_m = (m/z_L)(d_x - p_x)$.

(A13) In lens-array imager (A8), each of focal lengths $f_1, \ldots, f_{N-1}$ may be equal to focal length $f_0$.

(A14) In a lens-array imager according to any of (A1)-(A12), the lens array may be in a lens-array plane perpendicular to the longitudinal direction, the pixel array may be in the pixel-array plane.

(A15) In a lens-array imager according to any of (A1)-(A14), the plurality of apertured baffle-layers may include four apertured baffle-layers.

(A16) In a lens-array imager according to any of (A1)-(A15), between adjacent aperture stops of the plurality of aperture stops, each of the plurality of apertured baffle-layers may be opaque to visible electromagnetic radiation.

(A17) In a lens-array imager according to any of (A1)-(A16), each of the plurality of apertured baffle-layers may have a front surface, a rear surface, and a plurality of middle surfaces therebetween each forming a respective one of its plurality of aperture stops.

(A18) In a lens-array imager according to any of (A1)-(A17), a distance between each pair of immediately adjacent apertured baffle-layers of the plurality of apertured baffle-layers may equal zero in the longitudinal direction.

(A19) In lens-array imager (A18), the plurality of apertured baffle-layers may form a monolithic baffle layer.

Changes may be made in the above methods and systems without departing from the scope of the present embodiments. It should thus be noted that the matter contained in the above description or shown in the accompanying drawings should be interpreted as illustrative and not in a limiting sense. Herein, and unless otherwise indicated the phrase "in embodiments" is equivalent to the phrase "in certain embodiments," and does not refer to all embodiments. The following claims are intended to cover all generic and specific features described herein, as well as all statements of the scope of the present method and system, which, as a matter of language, might be said to fall therebetween.

What is claimed is:

1. A lens-array imager comprising:
   a plurality of lenses $L_{m=0}, L_1, \ldots, L_{N-1}$ each having a width $W_x$ and forming a lens array having a lens pitch $d_x$ in a transverse direction that is orthogonal to an optical axis of lens $L_0$ that defines a longitudinal direction;
   an image sensor including a plurality of pixels forming a pixel array including a plurality of pixel-array regions $R_{m=0}, R_1, \ldots, R_{N-1}$ having a sensor-region width $r_x$ and sensor-region pitch $p_x$ that are each less than lens pitch $d_x$ in the transverse direction; and
   a plurality of apertured baffle-layers between the image sensor and the lens array, each of the plurality of apertured baffle-layers being located at a respective distance $z_k$ from the pixel array and having a respective plurality of aperture stops $A_{m=0}, A_1, \ldots, A_{N-1}$ forming an aperture-stop array,
   a center of each aperture stop $A_m$ being collinear with both (i) a center of pixel-array region $R_m$ and (ii) an optical center of lens $L_m$,
   the aperture-stop array having an aperture-stop pitch $a_x$ in the transverse direction that approaches sensor-region pitch $p_x$ as distance $z_k$ approaches zero and approaches lens pitch $d_x$ as distance $z_k$ approaches a distance $z_L$ between lens $L_0$ and pixel-array region $R_0$ along the longitudinal direction,
   a width of each aperture stop $A_m$ having an upper limit that increases from sensor-region pitch $p_x$, when distance $z_k$ equals zero, to $W_x$ when distance $z_k$ equals distance $z_L$, such that aperture stops $A_m$ collectively transmit, through lens $L_m$, a range of chief-ray angles, and associated marginal rays, within an angle subtended by pixel-array region $R_m$ from the optical center of lens $L_m$ while blocking chief-rays and associated marginal rays outside of the subtended angle.

2. The lens-array imager of claim 1, the aperture-stop pitch $a_x$ being a linear function of $z_k$ that ranges from sensor-region pitch $p_x$ at distance $z_k$ equals zero to lens pitch $d_x$ when distance $z_k$ equals distance $z_L$.

3. The lens-array imager of claim 2, the linear function being $(1 - z_k/z_L)p_x + (z_k/z_L)d_x$.

4. The lens-array imager of claim 1, the width of each of the plurality of aperture stops not exceeding $r_x + (z_k/z_L)W_x$.

5. The lens-array imager of claim 4, the width of each of the plurality of aperture stops not exceeding $(z_k/z_L)W_x$.

6. The lens-array imager of claim 1, the width of each of the plurality of aperture stops not exceeding the larger of $(z_k/z_L)W_x$ and the diffraction-limited spot size formed by lens $L_m$ at pixel-array region $R_m$.

7. The lens-array imager of claim 1,
   when $(z_k/z_L)W_x$ is larger than a diffraction-limited spot size formed by lens $L_m$ at pixel-array region $R_m$, the width of each aperture stop $A_m$ not exceeding $(z_k/z_L)W_x$; and
   when $(z_k/z_L)W_x$ is smaller than the diffraction-limited spot size, the width of each aperture stop $A_m$ not exceeding the diffraction-limited spot size.

8. The lens-array imager of claim 1, for each lens $L_m$, a geometric-path-length between an optical center of lens $L_m$ and a center of pixel-array region $R_m$ being less than a focal length $f_m$ of lens $L_m$ such that lens $L_m$ is configured to focus converging light incident thereon to the center of the pixel-array region $R_m$.

9. The lens-array imager of claim 8, lens $L_m$ having a far edge with respect to lens $L_0$, lens $L_{m+1}$ having a near edge with respect to lens $L_0$ and adjacent to the far edge, and focal length $f_m$ of lens $L_m$ and focal length $f_{m+1}$ of lens $L_{m+1}$ being configured such that:
   a first light ray propagating from a center of pixel-array region $R_m$ toward the far edge of lens $L_m$ exits lens $L_m$ at a first propagation angle with respect to the longitudinal direction; and
   a second light ray propagating from a center of pixel-array region $R_{m+1}$ toward the near edge of lens $L_{m+1}$ exits lens $L_{m+1}$ at the first propagation angle.

10. The lens-array imager of claim 8, the geometric-path-length being along a geometric-path-direction, the focal length $f_m$ being an increasing function of an angle $\theta_m$ between the geometric-path-direction and the longitudinal direction, the geometric-path-direction being in a plane of the transverse direction and the longitudinal direction.

11. The lens-array imager of claim 10,
a deviation of angle $\theta_m$ from zero degrees being an increasing function of a distance between lens $L_m$ and lens $L_0$ in the transverse direction; and
of angles $\{\theta_0, \theta_1, \ldots, \theta_{N-1}\}$, angle $\theta_0$ being closest to zero degrees.

12. The lens-array imager of claim 10, the lens array being in a lens-array plane perpendicular to the longitudinal direction, the pixel array being in the pixel-array plane, angle $\theta_m$ satisfying $\tan \theta_m = (m/z_L)(d_x - p_x)$.

13. The lens-array imager of claim 8, each of focal lengths $f_1, \ldots, f_{N-1}$ being equal to focal length $f_0$.

14. The lens-array imager of claim 1, the lens array being in a lens-array plane perpendicular to the longitudinal direction, the pixel array being in the pixel-array plane.

15. The lens-array imager of claim 1, the plurality of apertured baffle-layers including four apertured baffle-layers.

16. The lens-array imager of claim 1, between adjacent aperture stops of the plurality of aperture stops, each of the plurality of apertured baffle-layers being opaque to visible electromagnetic radiation.

17. The lens-array imager of claim 1, each of the plurality of apertured baffle-layers having a front surface, a rear surface, and a plurality of middle surfaces therebetween each forming a respective one of its plurality of aperture stops.

18. The lens-array imager of claim 1, a distance between each pair of immediately adjacent apertured baffle-layers of the plurality of apertured baffle-layers being zero in the longitudinal direction.

19. The lens-array imager of claim 18, the plurality of apertured baffle-layers forming a monolithic baffle layer.

* * * * *